UNITED STATES PATENT OFFICE.

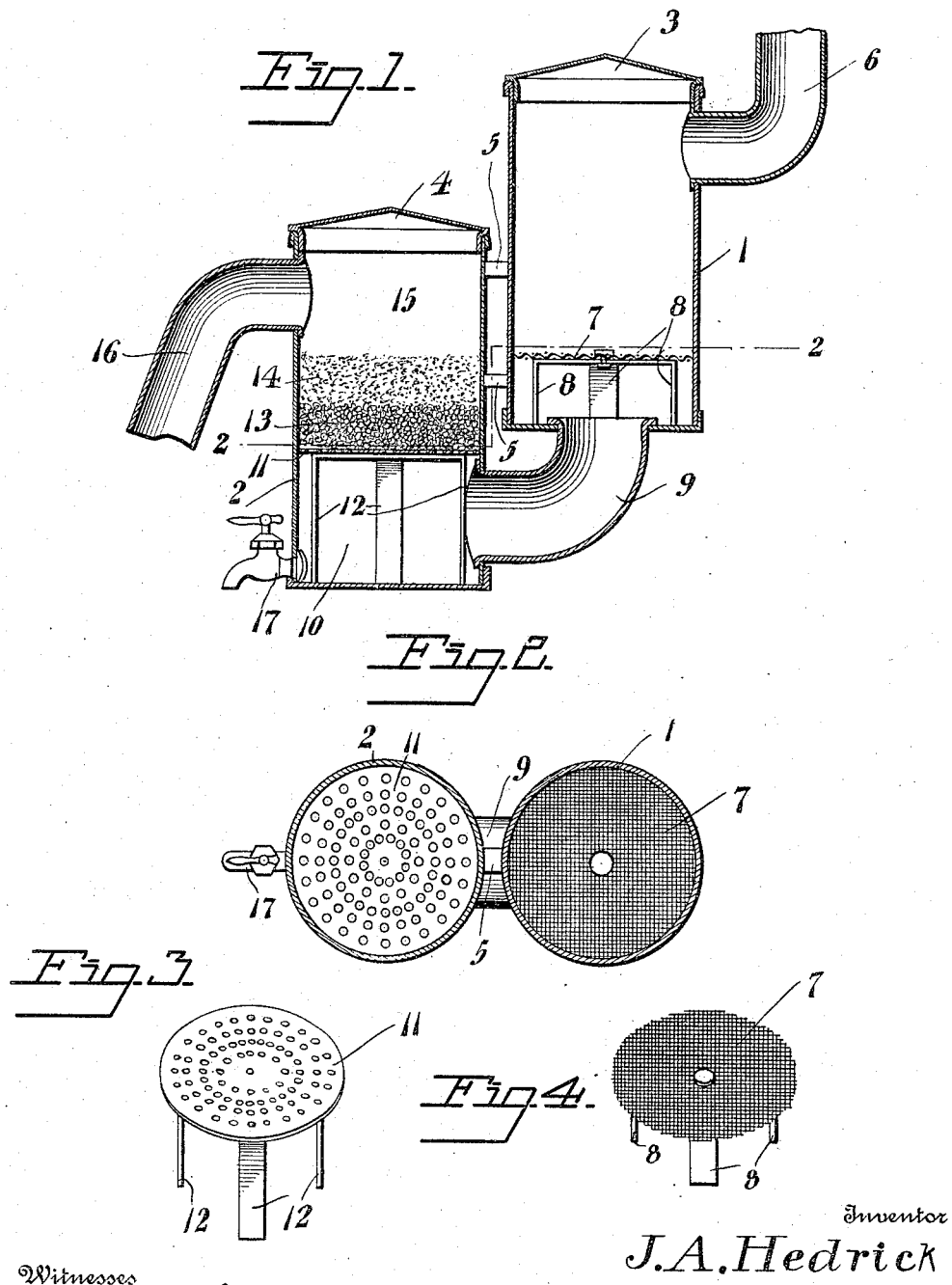

JAMES A. HEDRICK, OF ARNOLDS PARK, IOWA.

CISTERN-FILTER.

1,183,455. Specification of Letters Patent. Patented May 16, 1916.

Application filed November 22, 1915. Serial No. 62,882.

*To all whom it may concern:*

Be it known that I, JAMES A. HEDRICK, a citizen of the United States, residing at Arnolds Park, in the county of Dickinson and State of Iowa, have invented new and useful Improvements in Cistern-Filters, of which the following is a specification.

This invention relates to improvements in filters and particularly to a filter designed for use in conjunction with water cisterns or tanks, for removing from the water all foreign matter, so that the water will flow to the cistern in a pure condition.

The primary object of the invention is to provide a filter which will thoroughly and effectually remove the coarse and fine foreign particles from the water, and keep the portions of the water in which the coarse and fine particles are contained separated from each other, the arrangement being such as to screen from the water all leaves and other coarse trash and then to filter the water to remove therefrom all fine foreign substances.

A further object of the invention is to provide a filter which is simple of construction, reliable and efficient in operation, and which may be cleansed at desired intervals with ease and facility.

The invention consists of the features of construction, combination and arrangement of parts herein fully described and claimed, reference being had to the accompanying drawing in which:—

Figure 1 is a vertical section through a filter constructed in accordance with my invention. Fig. 2 is a sectional plan view on the line 2—2 of Fig. 1. Figs. 3 and 4 are detail views of the screen.

In carrying my invention into practice I provide a filter comprising a primary receptacle 1 and a secondary receptacle 2, said receptacles being open at the top and normally closed by detachable heads 3 and 4. The bodies of the receptacles are preferably cylindrical in form, and they may be of any desired capacity, and the receptacle 1 is arranged with its bottom at a higher elevation than the bottom of the receptacle 2, for the flow by gravity of the water from one to the other. A suitable connection 5 is provided between the two receptacles to hold them fixed with relation to each other, and in practice the receptacles may be arranged at any point between the roof of a house and a cistern and supported in any preferred manner.

The receptacle 1 is provided at its upper end with an inlet 6 for the flow thereinto of the water from the roof, bearing leaves and other trash as well as impurities. The water flowing into this receptacle 1 passes downward through a screen 7 arranged between the center and the bottom of said receptacle, and which catches and retains the leaves and other trash which are collected in the upper portion of said receptacle, which may be cleansed at intervals. This screen 7 is preferably made of woven wire of any desired mesh and provided with depending feet 8 to support it in an elevated position.

Leading from the bottom receptacle 1 to the bottom of the receptacle 2 is a conducting pipe or tube 9, through which the contaminated water freed from leaves and other such trash flows by gravity into a clear space or chamber 10 at the bottom of the receptacle 2. At the top of this space 10 is a screen 11 preferably made of perforated sheet metal and supported by depending legs 12. Upon this screen may be placed any desired number of layers of filtration material forming a filter bed, such as a bottom layer 13 of charcoal and a top layer 14 of sand or gravel, etc., the upper layer terminating below the top of the tank to leave a clear space 15 for the collection of the purified water. A discharge pipe 16 leads from the chamber 15 for conducting the purified water to the cistern, and a drain valve or cock 17 is arranged at the bottom of the receptacle 2 and communicates with the space 10 for the discharge at intervals from the space or chamber 10 of all sediment collected therein and which fails to pass through the screen 11.

It will be evident that in the use of the device the water will first be relieved of its coarse impurities in the receptacle 1 through which it flows in a downward direction and will then be relieved of its finer impurities in the receptacle 2, through which it flows in an upward direction, the water passing upward to a point in the chamber 15 above the level of the bottom of the connecting end of the pipe 16 so as to maintain a common level with the water in the receptacle 1, whereby an efficient feed of the water and filtering action is obtained.

I claim:—

A filter of the character described comprising a primary sheet metal receptacle having an inlet pipe connection at its upper end, a secondary sheet metal receptacle arranged in a plane parallel with and with its lower end at a point materially below the lower end of the primary receptacle, means rigidly connecting and holding said receptacles in fixed relation, an outlet pipe connection from the upper end of the secondary receptacle, an elevated support within the bottom of the primary receptacle comprising horizontal members having legs depending therefrom and spaced to form fluid passages, a screen carried by said supporting member and held clear of the bottom of the primary receptacle, an elbow pipe connecting the space at the bottom of the primary receptacle below the screen with the bottom of the secondary receptacle, said pipe extending at one end through the bottom of the primary receptacle at its other end through the side of the secondary receptacle, a support within the secondary receptacle comprising horizontal members arranged at a level above the adjacent end of said pipe and having spaced legs depending therefrom and providing a chamber in line with the pipe, a draw-off faucet communicating with said chamber, a screen mounted upon said support at a level above the delivery end of the elbow pipe, and a filtering bed mounted upon the screen and terminating below the connecting end of the discharge pipe.

In testimony whereof I affix my signature in presence of two witnesses.

JAMES A. HEDRICK.

Witnesses:
VAL. RAUSCH,
CHAS. WILSON.

Copies of this patent may be obtained for five cents each, by addressing the "Commissioner of Patents, Washington, D. C."